United States Patent
Fuellmeier et al.

(10) Patent No.: US 10,234,274 B2
(45) Date of Patent: Mar. 19, 2019

(54) METHOD FOR THICKNESS MEASUREMENT ON MEASUREMENT OBJECTS AND DEVICE FOR APPLYING THE METHOD

(71) Applicant: MICRO-EPSILON Messtechnik GmbH & Co. KG, Ortenburg (DE)

(72) Inventors: Herbert Fuellmeier, Egglham (DE); Guenter Schallmoser, Ruhstorf (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 322 days.

(21) Appl. No.: 15/028,241

(22) PCT Filed: Aug. 28, 2014

(86) PCT No.: PCT/DE2014/200431
§ 371 (c)(1),
(2) Date: Apr. 8, 2016

(87) PCT Pub. No.: WO2015/062594
PCT Pub. Date: May 7, 2015

(65) Prior Publication Data
US 2016/0252343 A1    Sep. 1, 2016

(30) Foreign Application Priority Data

Oct. 28, 2013 (DE) .......................... 10 2013 221 843
Jan. 8, 2014 (DE) .......................... 10 2014 200 157

(51) Int. Cl.
*G01B 11/06* (2006.01)
*G01B 21/04* (2006.01)
*G01B 21/08* (2006.01)
*G01B 11/14* (2006.01)

(52) U.S. Cl.
CPC .............. *G01B 11/06* (2013.01); *G01B 11/14* (2013.01); *G01B 21/042* (2013.01);
(Continued)

(58) Field of Classification Search
None
See application file for complete search history.

(56) References Cited

U.S. PATENT DOCUMENTS 9,528,811 B2 * 12/2016 Auzinger ................. G01B 5/06
2006/0132808 A1    6/2006 Jasinski et al.
(Continued)

FOREIGN PATENT DOCUMENTS

DE         10060144 A1    6/2002
DE      102009011122 A1   11/2009
(Continued)

OTHER PUBLICATIONS

The International Bureau of WIPO, International Preliminary Report on Patentability (English translation of ISA's Written Opinion) for Application No. PCT/DE2014/200431, dated May 3, 2016, 8 pages, Switzerland.

(Continued)

*Primary Examiner* — Michael Lebentritt
(74) *Attorney, Agent, or Firm* — Alston & Bird LLP

(57) ABSTRACT

A method for measuring the thickness on measurement objects, whereby at least one sensor measures against the object from the top and at least one other sensor measures against the object from the bottom and, at a known distance of the sensors to one another, the thickness of the object is calculated according to the formula D=Gap−(S1+S2), whereby D=the thickness of the measurement object, Gap=the distance between the sensors, S1=the distance of the top sensor to the upper side of the measurement object, and S2=the distance of the bottom sensor to the underside of the measurement object, is characterized by the compensation of a measurement error caused by tilting of the measurement object and/or by displacement of the sensors and/or by tilting of the sensors, whereby the displacement and/or the tilting is determined by calibration and the (Continued)

calculated thickness or the calculated thickness profile is corrected accordingly. The invention further concerns a device for applying the method.

15 Claims, 17 Drawing Sheets

(52) U.S. Cl.
CPC ........... *G01B 21/045* (2013.01); *G01B 21/08* (2013.01); *G01B 2210/44* (2013.01)

(56) References Cited

U.S. PATENT DOCUMENTS

| 2011/0125442 A1* | 5/2011 | Schallmoser ........ G01B 21/042 702/97 |
|---|---|---|
| 2014/0101954 A1 | 4/2014 | Sonntag et al. | |

FOREIGN PATENT DOCUMENTS

| DE | 102011107771 B4 | 10/2013 |
| JP | 2006/189389 A | 7/2006 |
| WO | WO 1991/015733 A1 | 10/1991 |
| WO | WO 2011/000665 A1 | 1/2011 |

OTHER PUBLICATIONS

International Searching Authority, International Search Report (ISR) and Written Opinion for International Application No. PCT/DE2014/200431, dated Dec. 18, 2014, 11 pages, The Netherlands.

\* cited by examiner

METHOD FOR THICKNESS MEASUREMENT ON MEASUREMENT OBJECTS AND DEVICE FOR APPLYING THE METHOD

CROSS REFERENCE TO RELATED APPLICATIONS

This application is a national stage application, filed under 35 U.S.C. § 371, of International Application No. PCT/DE2014/200431, filed Aug. 28, 2014, which claims priority to German Application No. 10 2013 221 843.5, filed Oct. 28, 2013 and German Application No. 10 2014 200 157.9, filed Jan. 8, 2014, the contents of all of which as are hereby incorporated by reference in their entirety.

BACKGROUND

Technical Field

The invention concerns a method for measuring the thickness on measurement objects in general, whereby at least one sensor measures against the object from the top and at least one other sensor measures against the object from the bottom. With a known distance between the sensors, the thickness of the object can be calculated in accordance with the generally known formula D=Gap−(S1+S2), whereby D=thickness of the measurement object, Gap=distance between the sensors, S1=distance of the top sensor to the upper side of the measurement object and S2=the distance of the top sensor to the underside of the measurement object. The invention further concerns a device for applying the method.

Related Art

In the industrial measuring field, the thickness of measurement objects is usually measured without contact by means of distance sensors, by measuring against the upper side of the measurement object with one sensor. Another sensor measures against the underside of the measurement object. With a known spacing of the sensors to one another, the thickness can be calculated according to the aforementioned formula. However, this mathematical relationship is true only if the sensors relative to one another relative to the measurement object and are aligned in an optimal manner, as shown in FIG. 1 in a schematic view. In practice, there are two major sources of error, namely the tilting of the measurement object, and/or the displacement and the possible tilting of the sensors.

As soon as the measurement object tilts—even when the sensors are in ideal alignment to one another—a thickness is measured that is greater than the actual thickness of the measurement object. This is due to the angle error. FIG. 2 shows the related measurement error, which occurs when the measurement object is tilted in the angular range from −30° to +30°.

The second source of error is the orientation of the sensors to one another, namely, whether they are aligned to one another and/or are tilted in relation to one another. If the sensors are misaligned and their measurement axes do not lay 100% on top of one another, the tilting of the measurement object, or its displacement within the measuring gap between the sensors, results in additional variances in the calculation of the thickness. FIG. 3 shows a thickness measurement using two laser distance sensors that are oppositely disposed, offset from one another. The measurement object is also tilted, with offset sensor axes. A tilting of the sensors can occur as well, namely, an angle error in the alignment of the sensors, which leads to further measurement errors.

Ideally, the two sensors lie on one axis, so that a tilting of the measurement object always results in a larger thickness value. However, due to mechanical tolerances, or due to the fact that the laser spot in laser sensors scatters quite considerably on the measurement object, which makes the alignment of the laser sensors more difficult, this cannot be achieved in practice. In addition, the laser beam does not correspond exactly to the ideal linearity axis of the sensor. In practice, a tilting of the measurement object can lead to a smaller thickness value, because the error is dependent on the error in the laser adjustment, as well as, in absolute terms, on the thickness of the measurement object.

FIG. 4 shows the development of the measurement error, which is caused only by an incorrect adjustment of the sensors (distance sensors).

The above-identified errors are measurement errors for distance sensors that perform a point measurement. The thickness measurement can similarly be conducted with sensors, which project a line to measure (for example laser line scanners, light section sensors), or allow a two-dimensional measurement (for example matrix arrays or cameras). Even when using laser line scanners, the measurement will be incorrect if tilting of the measurement object occurs with a simultaneous displacement or tilting of the sensors.

By using line scanners or planar sensors, the tilt angle of the measurement object can be determined in addition to the distance. With the help of the additional information concerning the tilt angle of the measurement object, it is possible to correct the previously identified errors, so as to be able to offset the thickness error caused by the tilt.

The aforementioned method for measuring thickness is typically used in systems with C-frames or O-frames. In the C-frame, the two distance sensors are mechanically fixed, or allocated, to one another. For traversing measurement of objects with a larger width, the entire C-frame is moved over the measurement object (or vice versa) and the thickness profile of the measurement object is recorded. The initial adjustment error does not change across the traversing width, i.e. the error is constant and independent of the x-direction.

The two distance sensors can also be installed in an O-frame. The sensors are respectively mounted on a shaft and are moved by a motor, for example, via a toothed belt. For mechanical reasons, the previously discussed laser adjustment error, which is dependent on the C-frame as well, also changes as a function of the position of the sensors in traversing direction.

The alignment of the sensors would not cause an additional measurement error, if one could ensure that the measurement object is always in the same position in relation to the sensors. However, since in a real-world production environment there are always variances in positioning, tilting of the measurement object in relation to the sensors is commonplace. The determination of such tilting by means of line sensors, by means of which a calibration is performed, is known per se from practice.

The known solution is disadvantageous, however, insofar as the sensors used therein have to be precisely aligned with one another. Once a displacement of the sensors occurs, the measurement error can no longer be corrected.

A precise alignment of the sensors is more difficult, the larger the production plant. Due to unavoidable, not insignificant mechanical tolerances, the measurement axes of the sensors cannot be precisely aligned to one another. The use of special means of adjustment, for example micrometer screws, etc., is expensive, and their application is complicated. In addition, this type of fine adjustment is difficult to accomplish in harsh industrial environments.

BRIEF SUMMARY

The underlying task of the present invention is therefore to provide a method for measuring the thickness on measurement objects, with which measurement errors caused by tilting of the measurement object, and/or by displacement or tilting/angle errors of the sensors, are eliminated in a simple manner.

The task as stated above is solved by the features of claim 1. Thus the inventive method is characterized by the compensation of a measurement error caused by tilting of the measurement object and/or displacement of the sensors and/or by tilting of the sensors, whereby the displacement and/or the tilting is determined by calibration and the calculated thickness or the calculated thickness profile is corrected accordingly. According to the invention, a calibration of the displacement or tilting of the sensors is carried out.

Since tilting of the measurement object cannot be detected, it is in principle not possible to calibrate thickness errors for tilting of the measurement object during measurement with point sensors. Consequently, laser line sensors, with which the tilting of the measurement object can be detected as well, are used for high-precision thickness measurement. Two-dimensionally measuring sensors (e.g. cameras) or multiple point sensors can be used as well. The tilt in one axis can be determined from the measured values of at least two sensors that measure against one surface. Correspondingly, at least three sensors are required for two axes.

The method is illustrated in the following, using the example of a thickness measurement on strip material with an O-frame.

In the O-frame there are linear axes above and below the strip material, which run over the upper and lower sides of the strip material transverse to the production direction of the laser line sensors. The sensors measure the respective distance to the upper or the lower side. Using the known distance between the sensors, the thickness profile of the strip material transverse to the traversing direction is determined. Hereinafter, the coordinate axes are identified as follows:

y-axis: The transport direction or the movement direction of the strip material
x-axis: Transverse to the transport direction, in the direction of traversal
z-axis: Perpendicular to the strip material, in the direction of the distance measurement of the sensors The axes of the laser line sensors are aligned in x-direction and should ideally lie exactly congruently on top of one another at every point within the measuring gap. For the already known reasons, this cannot be executed; or can only be executed with considerable effort. Instead, the displacement of the sensors is determined during a calibration run, and the calculated thickness profile is subsequently corrected.

The tilting of the measurement object in x-direction results in the following situation:

A compensation of the tilting error of the thickness can only take place, if the laser spot is precisely aligned. A laser adjustment error as small as 0.1 mm causes an error of 18 μm at a 10° tilt. The determined thickness can thus be calculated to be thinner. A tilting of the measurement object should increase the thickness. If the sensors are not disposed exactly on top of one another, however, the calculated thickness can also be smaller.

Since the demand for an ideal alignment of the sensors is mechanically impossible to meet, suitable software mathematically compensates the resulting error as follows:

1. Master measurement with a suitable calibration means, e.g. a gauge block ("master part"), at a 0° tilt. Thus the constant "Gap" of the thickness calculation formula is known.
2. Calculation of the offset (=caused by incorrect laser adjustment FL) at 10° . . . 20° tilt in x-direction.
3. Calculation of the offset at a tilt of −10° . . . −20° tilt in x-direction.

Since the thickness of the used gauge block is known, the offset (=FL) in x-direction can be calculated with a known tilt angle and a known gap value. The offset in x-direction is slightly different for positive and negative angles.

Due to the fixed installation of the sensors, the displacement only has to be determined once when using a C-frame.

When using an O-frame, the sensors are moved by means of two linear axes. Therefore, the determined x-offset is not constant, i.e. it is correct only at the position in which the offset calculation was performed. The displacement of the sensors can differ, for example, as a result of slight variations in the velocities of the linear axes in traversing direction. The first step toward being able to determine the x-offset as a function of the position in traversing direction is to perform a compensation run. During the compensation run, a suitable calibration means, for example a gauge block of known thickness (master part), is pivoted in the measuring gap and moved along the entire traversing width of the measuring gap.

The master part is connected to one of the two traversing carriages, which carry the sensors. This can be either the upper or the lower carriage. In the example, the master part is connected to the lower carriage by means of a pivot mechanism (FIG. 17). The pivot mechanism includes a pneumatic rotary cylinder that has adjustable end positions. The exact alignment of the master part for the compensation run can be adjusted via the setting of the end positions. On the rotary cylinder there is a pivot arm, to which in turn the master part is mounted. The master part is a gauge block of known thickness. In one end position, the master part is pivoted precisely into the measuring gap (FIG. 17a), in the other end position it is pivoted completely out of the measuring gap (FIG. 17b). Ideally, the master part is aligned in such a way that the incidence of the laser line is exactly vertical. For the compensation run, the master part is pivoted into the measuring gap with the help of the rotary cylinder in such a way that the top and bottom sensors measure against the upper and lower surfaces of the master piece. The pivoting can be repeated from time to time, by which the setting of the sensors relative to one another can be checked, or a new compensation run can be performed. Other delivery means, for example electric or magnetic drives, can also be used for the pivoting. Pivoting by hand would be conceivable as well, but that would require user intervention.

Traversal in x-direction with a pivoted-in master part of known thickness $D_{Master}$, which is not tilted ($\square=0°$), results in the measured values $S1_{Master}$ and $S2_{Master}$ for Sensor 1 (top) and Sensor 2 (bottom). It should be noted that the measured values S1 and S2 are composed of a multitude of measurement points that describe the laser line. In conventional laser-line sensors 640 measurement points, for example, are used in x-direction. The number of measurement points depends on the number of pixels of the CCD-matrix used. For the sake of simplicity, however, in the following we will refer to measured values S1 and S2.

The master part is mechanically fixed to the lower carriage (at the bottom sensor), i.e. the x-offset of the bottom sensor to the master part should always result in zero. The master part is adjusted in such a way that each sensor detects one edge of the master part, i.e. the laser line extends beyond the edge. The sensor therefore displays only, for example, 620 of the 640 measurement points. Since the master part is fixed relative to the bottom sensor, an alignment of only the top sensor would suffice.

Of the measurement points that lie on the surface of the master part, gap as a function of x, i.e. of the position during the traversal, is determined first:

$$Gap = Gap(x) = D_{Master} + S1_{Master} + S2_{Master}$$

The reason for this is that, due to mechanical tolerances, etc., the z-spacing of the sensors can change over the traversing width as well. This is determined by means of the compensation run, so that the error in z-direction is thereby compensated. The measured values can be stored as a function of x or as a look-up table. This compensation in z-direction is a prerequisite for every thickness measurement and is the state of the art.

During the compensation run, the edge of the master part is additionally recorded as a function of the position in traversing direction (=x-direction).

Since, with the determination of the edge, an absolute measurement value in x-direction is available for the master part, the offset FL of the top sensor relative to the bottom sensor can be determined: FL=FL(x).

Ideally, the displacement of the sensors, at least in the starting position (x=0), would be equal to zero; if indeed the sensors were, at least at this position, perfectly aligned and adjusted to one another. The prerequisite would be that all the parameters of the positions of the sensors and the master part are known, as well as the measurement values of the sensors relative to the housing, or to the mounting position of the sensors. From this then the displacement $FL_0$=FL(x=0), already for the start position of the compensation run, for example, can be determined. However, since there are a variety of influencing factors in effect here as well, it is easier to establish the displacement at the starting position (x=0) as an initially unknown constant $FL_0$, and to determine the actual displacement at an arbitrary position in x-direction.

If at first, for the sake of simplicity, only the variance of the displacement is of interest, the result of the compensation run is the function FL'(x)=dFL(x) (values again as a function of x or in a look-up table), in which by definition $FL_0$ is initially set to be equal to zero, and factored out later.

FIG. 5 shows the thus obtained x-displacement as a function of the position in traversing direction.

At the beginning of the calibration run, the offset FL at position x=0 is equal to zero, because by definition the zero point is set at this position. The further the two sensors are moved along their respective linear axes in traversing direction, the greater the x-offset becomes, until the value remains constant towards the end of the movement. The offset also displays a superimposed sinusoidal oscillation, which stems from the drive of the linear axes. It can be seen that the x-offset at a traversing width of 2500 mm can be as much as 2 mm. It is also possible for the offset to become smaller again in the course of the traversal; this also depends on the manner of movement of the axes, or the mounting of the sensors.

The calibration of tilting is then carried out in the form of a tilting test at a position $x_0$ within the traversing range with a variety of tilts (e. g. $\square$=+/−10°, +/−20°) of the master part. The absolute displacement at the calibration position FL=$FL_{kali}(x_0)$ is thus obtained.

FIG. 3 shows the geometric relationships during the tilting test. First, via the tilting test at the position $x_0$ and from the known tilting of the master part of a known thickness $D_{Master}$, the displacement/tilting $FL_{kali}(x_0)$ must be determined by means of the following calculation:

$$D_{Master} = D'^* \cos(\square) \quad (1)$$

D' is still not the actual measured value D"=Gap−(S1+S2) of the thickness measurement, but rather the value that has already been corrected by the displacement of the sensors (see FIG. 3):

$$D' = Gap - (S1' + S2). \quad (2)$$

S1' is the measured value that has already been corrected by the displacement FL, for which applies:

$$S1' = S1 - FL^* \tan(\square). \quad (3)$$

With the actual measured values for sensor 1 (S1) and sensor 2 (S2) and the known thickness of the master target $D_{Master}$, the displacement $FL_{kali}(x_0)$ at the calibration position $x_0$) can now be determined.

The (across the traversing width variable) displacement is generally composed of $$FL(x) = FL_0 + dFL(x),$$

whereby the function dFL(x) is known from the compensation run.

According to the above instructions, the actual absolute displacement at the calibration position $x_0$ is measured as follows:

$$FL(x_0) = FL_{kali}(x_0) = FL_0 + dFL(x_0)$$

From this $FL_0$ can be determined by $$FL_0 = FL_{kali}(x_0) - dFL(x_0)$$

Finally, displacement of the sensors that is variable across the traversing width is $$FL(x) = FL_0 + dFL(x) = FL_{kali}(x_0) - dFL(x_0) + dFL(x)$$

If the calibration is performed at the starting position, i.e. $x_0$=0, the following is directly applicable:

$$FL_0 = FL_{kali}(x=0).$$

With reference to FIGS. 6 to 11, the tilting test provides the following results:

FIGS. 6 to 11 show the raw signal of the determined thickness at a tilting of the master part (thickness=5.004 mm) of +/−10°. At a 10° tilt, the calculated thickness, caused by the tilting of the measurement object, is 5.081 mm. The determination of the laser adjustment error FL was conducted at a traversing position of 498 mm. In each case the thickness is plotted on the left and the sensor changes are plotted on the right y-axis.

In detail, FIGS. 6 to 11 show:
FIG. 6: Tilting of the measurement object by 0°, traversing position (x-direction) at 498 mm
FIG. 7: Tilting of the measurement object by 10°, traversing position (x-direction) at 498 mm
FIG. 8: Tilting of the measurement object by −10°, traversing position (x-direction) at 498 mm
FIG. 9: Tilting of the measurement object by 0°, traversing position (x-direction) at 2540 mm FIG. 10: Tilting of the measurement object by 10°, traversing position (x-direction) at 2540 mm FIG. 11: Tilting of the measurement object by −10°, traversing position (x-direction) at 2540 mm Thus, in a completely analogous manner, the actual thickness of a measurement object of unknown thickness can be determined, in which not only the tilting error, but also the error resulting from the displacement/tilting of the sensors is compensated.

First, the actual measured values S1 and S2 are recorded. The value S1', that is corrected by the displacement/tilting of the sensors, has to be calculated from S1:

$$S1'=S1-FL*\tan(\square)$$

The thickness D' is obtained from the value S1', that is corrected by the displacement $$D'=\text{Gap}-(S1'+S2).$$

For the actual thickness of the measured object applies then, analogously to (1), $$D=D'*\cos$$

A tilt in y-direction, i.e. in production direction, results in the following:

In order to be able to compensate for a tilting of the measurement object in the production direction (y-direction), the same conditions apply as are described above. The tilting of the measurement object in y-direction must likewise be determined by measurement. It is also conceivable to have an additional line sensor or a point sensor pair, which determines the tilt in y-direction. It should be made clear that the laser lines of the sensors used for the thickness measurement are still aligned in x-direction. However, if the measurement object is tilted in y-direction, the displacement/tilting of the sensors in y-direction has a completely analogous effect on the thickness measurement.

FIG. 12 shows the measurement error if the axes of the sensors are not on top of one another (laser adjustment error FL ca. 0.7 mm, target thickness 5.004 mm). The measured thickness is plotted on the left y-axis, the thickness error, caused only by the incorrect laser adjustment, is on the right. Here, too, the sensors are tilted as a function of the x-position, but in y-direction. The laser adjustment error FL of the two sensors at one position $x_0$ is therefore calculated in a completely analogous manner. The variation of this error is recorded during the compensation run.

As described for the tilting of the measurement object in x-direction, the actual error of the laser adjustment is calculated here as well, namely as follows:

1. Master measurement of the gauge block at a 0° tilt. Thus the constant "Gap" of the thickness calculation formula is known.
2. Calculation of the offset (=caused by incorrect laser adjustment FL) at a tilt of 10° . . . 20° in y-direction.
3. Calculation of the offset at a tilt of −10° . . . −20° in y-direction.

The variation of the laser adjustment error for the y-direction is recorded during the compensation run (=pivoted-in Master Target, moving the traversing unit in x-direction). This can be carried out in a particularly simple manner with the same master part, whereby the master part exhibits a slanted edge on the side opposite to that for the compensation of the x-displacement. This refers to an edge, the orientation of which deviates from the perpendicular to the traversing direction (=transport direction), preferably by 45°. FIG. 13 illustrates this relationship. If the alignment of the sensors in y-direction changes, the laser line sweeps across the orientation of the edge, which deviates from the perpendicular to the traverse direction (x-direction), in the example the 45°-direction, whereby the measured value, namely the length of the laser line on the measurement target, changes. Therefore, a conclusion on the tilting in y-direction can be drawn from the measurement point, which is on the edge, or the length of the laser line.

FIG. 14 shows the variation of the laser line on the master target in y-direction:

FIGS. 15 and 16 show the result after a successful compensation of the tilting error.

The values in FIG. 15 are recorded at the position at which the laser adjustment error was determined. FIG. 16 is recorded while taking into consideration the offset variation, which was determined during the compensation run.

In each case, the determined, real thickness is plotted on the left y-axis, without taking into account the angle error. The right y-axis shows the thickness variation corrected by the angle error, taking into consideration the laser adjustment error FL.

BRIEF DESCRIPTION OF THE FIGURES

There are a variety of options for developing and implementing the teaching of the present invention in an advantageous manner. On this topic, we refer to the claims subordinate to claim 1, on the one hand, and on the other hand, to the above description of preferred design examples of the method according to the invention by means of the drawing. In conjunction with the explanation of the preferred design examples of the method according to the invention by means of the drawing, other generally preferred embodiments and refinements of the teaching are explained as well. The drawing comprises the following figures FIG. 1 in a schematic view, the principle of thickness measurement with a pair of distance sensors measuring against the measurement object (state of the art), FIG. 2 in a schematic diagram, the measurement error that results from a tilting of the measurement object, FIG. 3 in a schematic view, the principle of thickness measurement with two opposite laser distance sensors, which are disposed offset to one another, FIG. 4 in a schematic diagram, the development of the measurement error that is caused entirely by an incorrect adjustment of the sensors, FIG. 5 in a schematic diagram, the determined x-offset as a function of the position in the direction of traversing (x-direction), FIGS. 6 to 11 in a schematic diagram, the raw signal of the thickness to be determined when the gauge block is tilted (master part), FIG. 12 in a schematic diagram, the measurement error, which occurs when the axes of the sensors do not lie on top of one another in y-direction, FIG. 13 in a schematic representation, the relationship concerning laser adjustment errors in x-direction (left edge) and y-direction (by evaluation of the measured value at the edge, or the length of the laser line using a 45° edge), FIG. 14 in a schematic diagram, the change in the laser line on the master target to demonstrate the changes in the sensor position in y-direction, FIGS. 15 and 16 in a schematic diagram, the result of a successful compensation of tilting error and FIG. 17 in a schematic view, the principle of the inward pivoting of a master part in the measuring gap by means of a rotary actuator, for example, pneumatic rotary cylinder or electric motor.

DETAILED DESCRIPTION OF VARIOUS EMBODIMENTS

Figure 1:
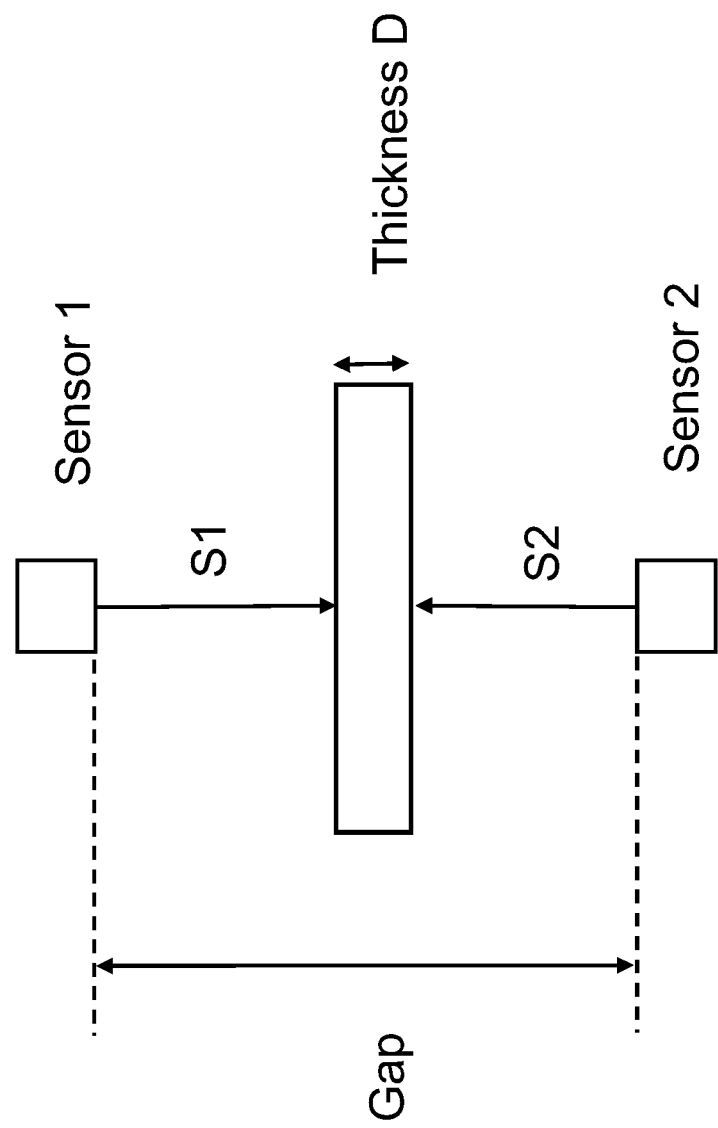
Figure 2:
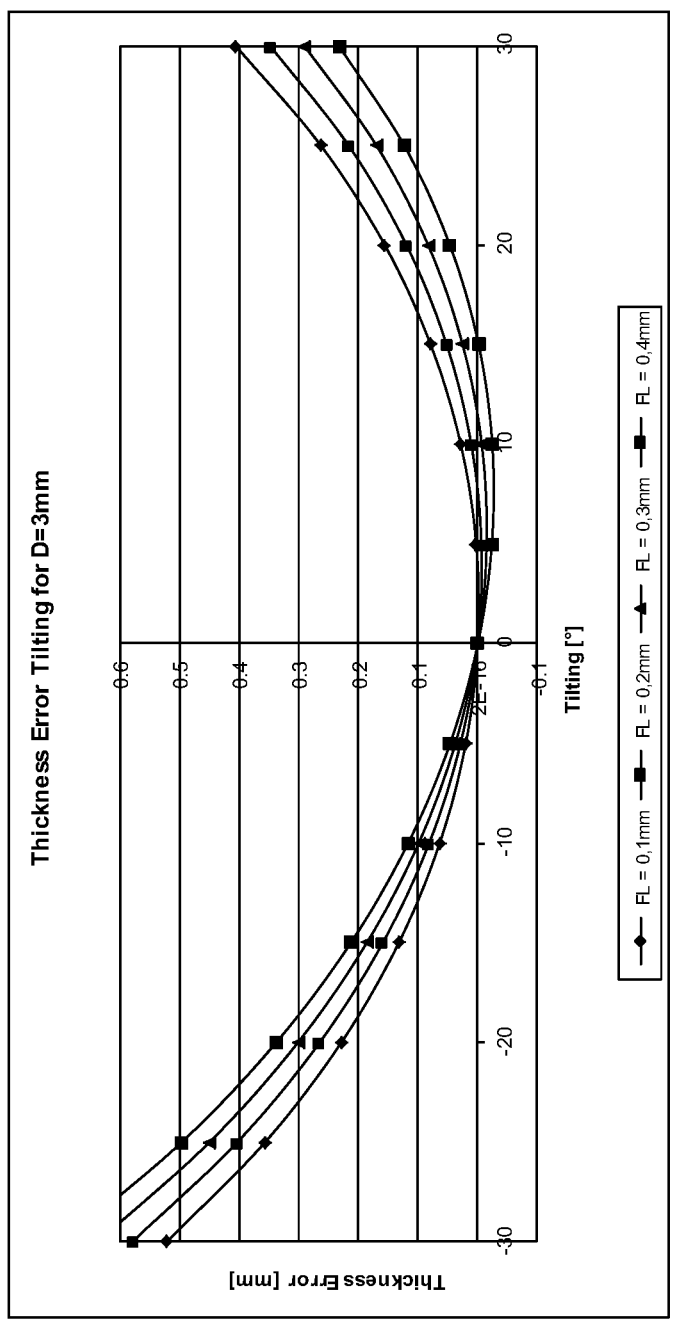

The underlying task of the present invention is therefore to provide a method for measuring the thickness on measurement objects, with which measurement errors caused by tilting of the measurement object, and/or by displacement or tilting/angle errors of the sensors, are eliminated in a simple manner.

The task as stated above is solved by the features of claim 1. Thus the inventive method is characterized by the compensation of a measurement error caused by tilting of the measurement object and/or displacement of the sensors and/or by tilting of the sensors, whereby the displacement and/or the tilting is determined by calibration and the calculated thickness or the calculated thickness profile is corrected accordingly. According to the invention, a calibration of the displacement or tilting of the sensors is carried out.

Since tilting of the measurement object cannot be detected, it is in principle not possible to calibrate thickness errors for tilting of the measurement object during measurement with point sensors. Consequently, laser line sensors, with which the tilting of the measurement object can be detected as well, are used for high-precision thickness measurement. Two-dimensionally measuring sensors (e.g. cameras) or multiple point sensors can be used as well. The tilt in one axis can be determined from the measured values of at least two sensors that measure against one surface. Correspondingly, at least three sensors are required for two axes.

The method is illustrated in the following, using the example of a thickness measurement on strip material with an O-frame.

In the O-frame there are linear axes above and below the strip material, which run over the upper and lower sides of the strip material transverse to the production direction of the laser line sensors. The sensors measure the respective distance to the upper or the lower side. Using the known distance between the sensors, the thickness profile of the strip material transverse to the traversing direction is determined. Hereinafter, the coordinate axes are identified as follows:
 y-axis: The transport direction or the movement direction of the strip material
 x-axis: Transverse to the transport direction, in the direction of traversal
 z-axis: Perpendicular to the strip material, in the direction of the distance measurement of the sensors The axes of the laser line sensors are aligned in x-direction and should ideally lie exactly congruently on top of one another at every point within the measuring gap. For the already known reasons, this cannot be executed; or can only be executed with considerable effort. Instead, the displacement of the sensors is determined during a calibration run, and the calculated thickness profile is subsequently corrected.

The tilting of the measurement object in x-direction results in the following situation:

A compensation of the tilting error of the thickness can only take place, if the laser spot is precisely aligned. A laser adjustment error as small as 0.1 mm causes an error of 18 μm at a 10° tilt. The determined thickness can thus be calculated to be thinner. A tilting of the measurement object should increase the thickness. If the sensors are not disposed exactly on top of one another, however, the calculated thickness can also be smaller.

Since the demand for an ideal alignment of the sensors is mechanically impossible to meet, suitable software mathematically compensates the resulting error as follows:
1. Master measurement with a suitable calibration means, e.g. a gauge block ("master part"), at a 0° tilt. Thus the constant "Gap" of the thickness calculation formula is known.
2. Calculation of the offset (=caused by incorrect laser adjustment FL) at 10° . . . 20° tilt in x-direction.
3. Calculation of the offset at a tilt of −10° . . . −20° tilt in x-direction.

Since the thickness of the used gauge block is known, the offset (=FL) in x-direction can be calculated with a known tilt angle and a known gap value. The offset in x-direction is slightly different for positive and negative angles.

Due to the fixed installation of the sensors, the displacement only has to be determined once when using a C-frame.

When using an O-frame, the sensors are moved by means of two linear axes. Therefore, the determined x-offset is not constant, i.e. it is correct only at the position in which the offset calculation was performed. The displacement of the sensors can differ, for example, as a result of slight variations in the velocities of the linear axes in traversing direction. The first step toward being able to determine the x-offset as a function of the position in traversing direction is to perform a compensation run. During the compensation run, a suitable calibration means, for example a gauge block of known thickness (master part), is pivoted in the measuring gap and moved along the entire traversing width of the measuring gap.

Figure 17:
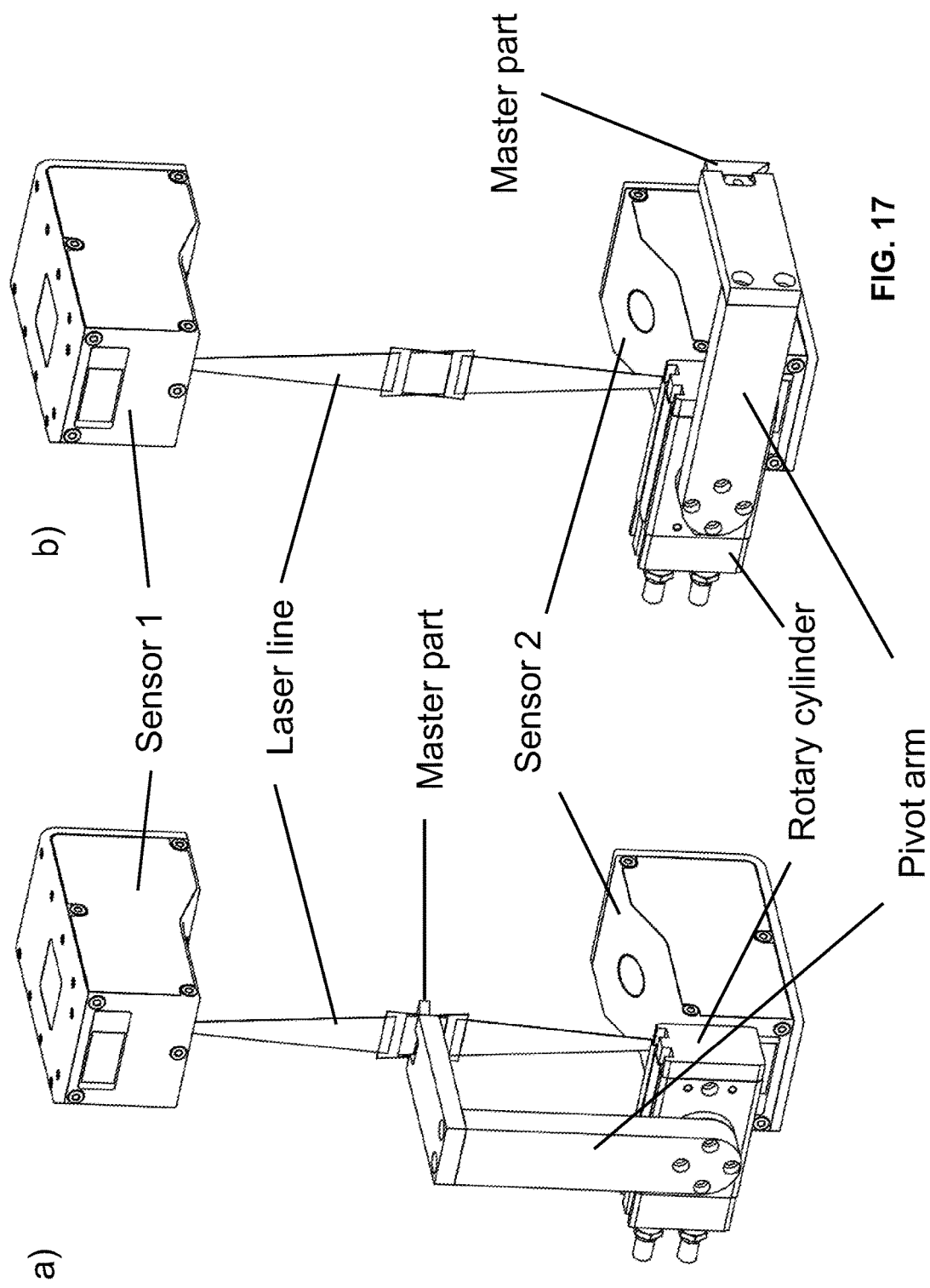

The master part is connected to one of the two traversing carriages, which carry the sensors. This can be either the upper or the lower carriage. In the example, the master part is connected to the lower carriage by means of a pivot mechanism (FIG. 17). The pivot mechanism includes a pneumatic rotary cylinder that has adjustable end positions. The exact alignment of the master part for the compensation run can be adjusted via the setting of the end positions. On the rotary cylinder there is a pivot arm, to which in turn the master part is mounted. The master part is a gauge block of known thickness. In one end position, the master part is pivoted precisely into the measuring gap (FIG. 17a), in the other end position it is pivoted completely out of the measuring gap (FIG. 17b). Ideally, the master part is aligned in such a way that the incidence of the laser line is exactly vertical. For the compensation run, the master part is pivoted into the measuring gap with the help of the rotary cylinder in such a way that the top and bottom sensors measure against the upper and lower surfaces of the master piece. The pivoting can be repeated from time to time, by which the setting of the sensors relative to one another can be checked, or a new compensation run can be performed. Other delivery means, for example electric or magnetic drives, can also be used for the pivoting. Pivoting by hand would be conceivable as well, but that would require user intervention.

Traversal in x-direction with a pivoted-in master part of known thickness $D_{Master}$, which is not tilted (☐=0°), results in the measured values $S1_{Master}$ and $S2_{Master}$ for Sensor 1 (top) and Sensor 2 (bottom). It should be noted that the measured values S1 and S2 are composed of a multitude of measurement points that describe the laser line. In conventional laser-line sensors 640 measurement points, for example, are used in x-direction. The number of measurement points depends on the number of pixels of the CCD-matrix used. For the sake of simplicity, however, in the following we will refer to measured values S1 and S2.

The master part is mechanically fixed to the lower carriage (at the bottom sensor), i.e. the x-offset of the bottom sensor to the master part should always result in zero. The master part is adjusted in such a way that each sensor detects one edge of the master part, i.e. the laser line extends beyond the edge. The sensor therefore displays only, for example, 620 of the 640 measurement points. Since the master part is fixed relative to the bottom sensor, an alignment of only the top sensor would suffice.

Of the measurement points that lie on the surface of the master part, gap as a function of x, i.e. of the position during the traversal, is determined first:

$$\text{Gap} = \text{Gap}(x) = D_{Master} + S1_{Master} + S2_{Master}$$

The reason for this is that, due to mechanical tolerances, etc., the z-spacing of the sensors can change over the traversing width as well. This is determined by means of the compensation run, so that the error in z-direction is thereby compensated. The measured values can be stored as a function of x or as a look-up table. This compensation in z-direction is a prerequisite for every thickness measurement and is the state of the art.

During the compensation run, the edge of the master part is additionally recorded as a function of the position in traversing direction (=x-direction).

Since, with the determination of the edge, an absolute measurement value in x-direction is available for the master part, the offset FL of the top sensor relative to the bottom sensor can be determined: $FL=FL(x)$.

Ideally, the displacement of the sensors, at least in the starting position (x=0), would be equal to zero; if indeed the sensors were, at least at this position, perfectly aligned and adjusted to one another. The prerequisite would be that all the parameters of the positions of the sensors and the master part are known, as well as the measurement values of the sensors relative to the housing, or to the mounting position of the sensors. From this then the displacement $FL_0=FL(x=0)$, already for the start position of the compensation run, for example, can be determined. However, since there are a variety of influencing factors in effect here as well, it is easier to establish the displacement at the starting position (x=0) as an initially unknown constant $FL_0$, and to determine the actual displacement at an arbitrary position in x-direction.

If at first, for the sake of simplicity, only the variance of the displacement is of interest, the result of the compensation run is the function $FL'(x)=dFL(x)$ (values again as a function of x or in a look-up table), in which by definition $FL_0$ is initially set to be equal to zero, and factored out later.

Figure 5:
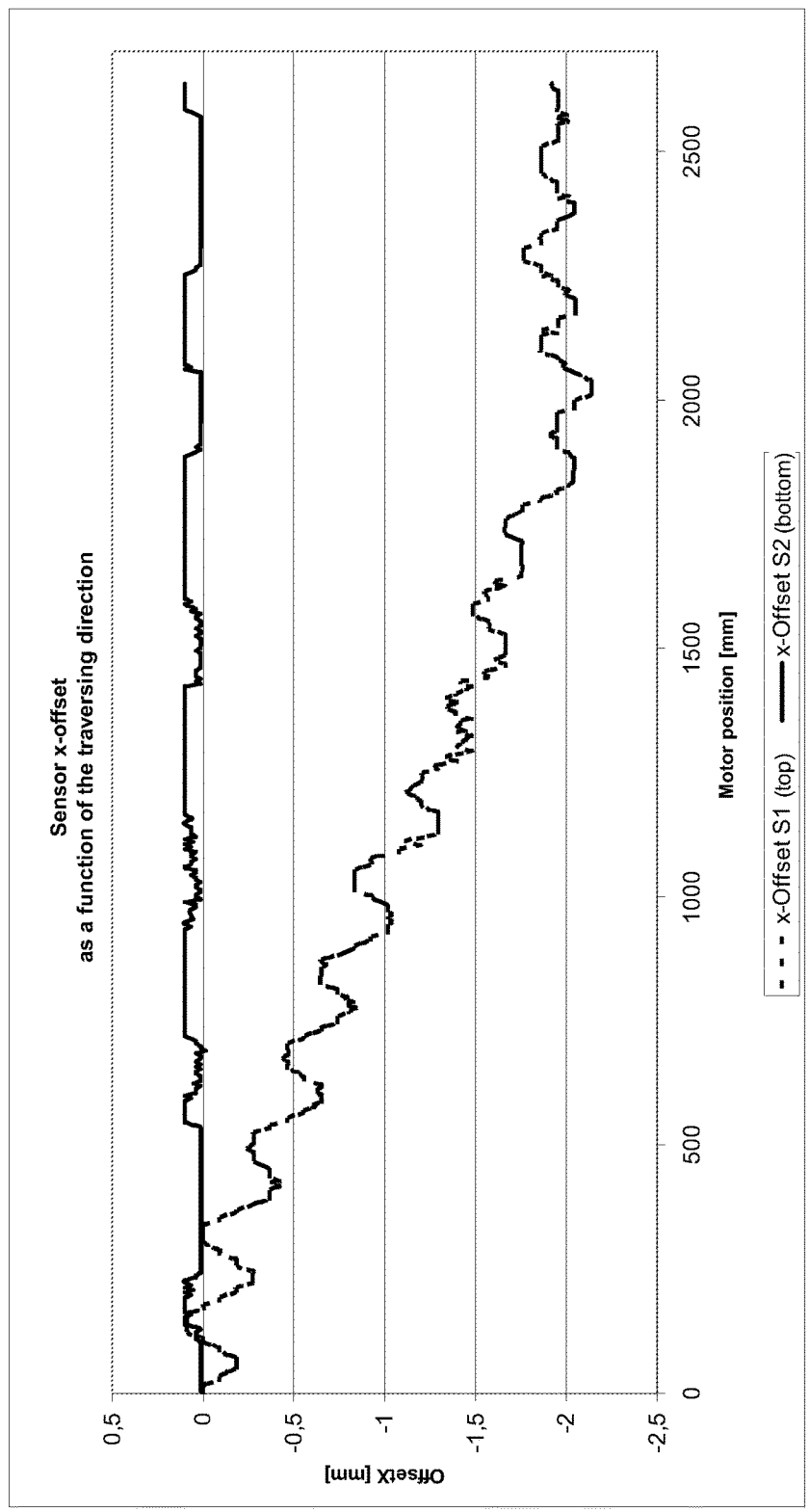

FIG. 5 shows the thus obtained x-displacement as a function of the position in traversing direction.

At the beginning of the calibration run, the offset FL at position x=0 is equal to zero, because by definition the zero point is set at this position. The further the two sensors are moved along their respective linear axes in traversing direction, the greater the x-offset becomes, until the value remains constant towards the end of the movement. The offset also displays a superimposed sinusoidal oscillation, which stems from the drive of the linear axes. It can be seen that the x-offset at a traversing width of 2500 mm can be as much as 2 mm. It is also possible for the offset to become smaller again in the course of the traversal; this also depends on the manner of movement of the axes, or the mounting of the sensors.

The calibration of tilting is then carried out in the form of a tilting test at a position $x_0$ within the traversing range with a variety of tilts (e. g. $\square=+/-10°, +/-20°$) of the master part. The absolute displacement at the calibration position $FL=FL_{kali}(x_0)$ is thus obtained.

Figure 3:
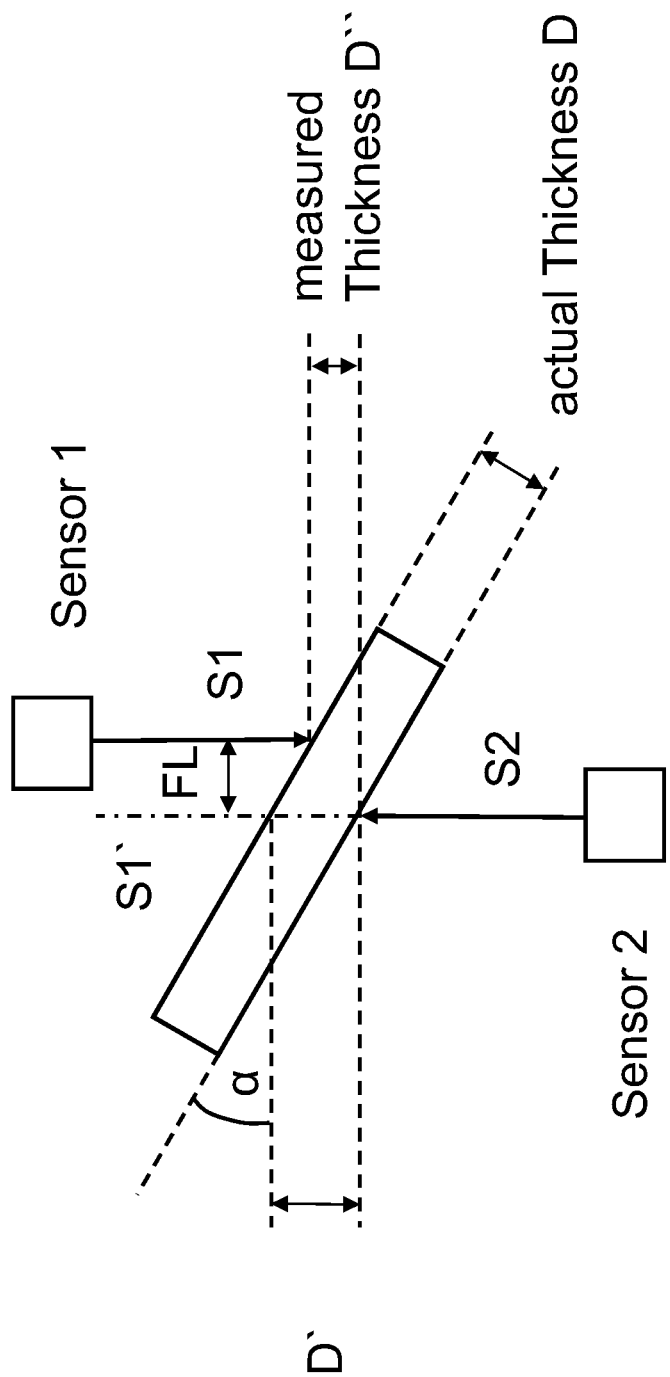
Figure 4:
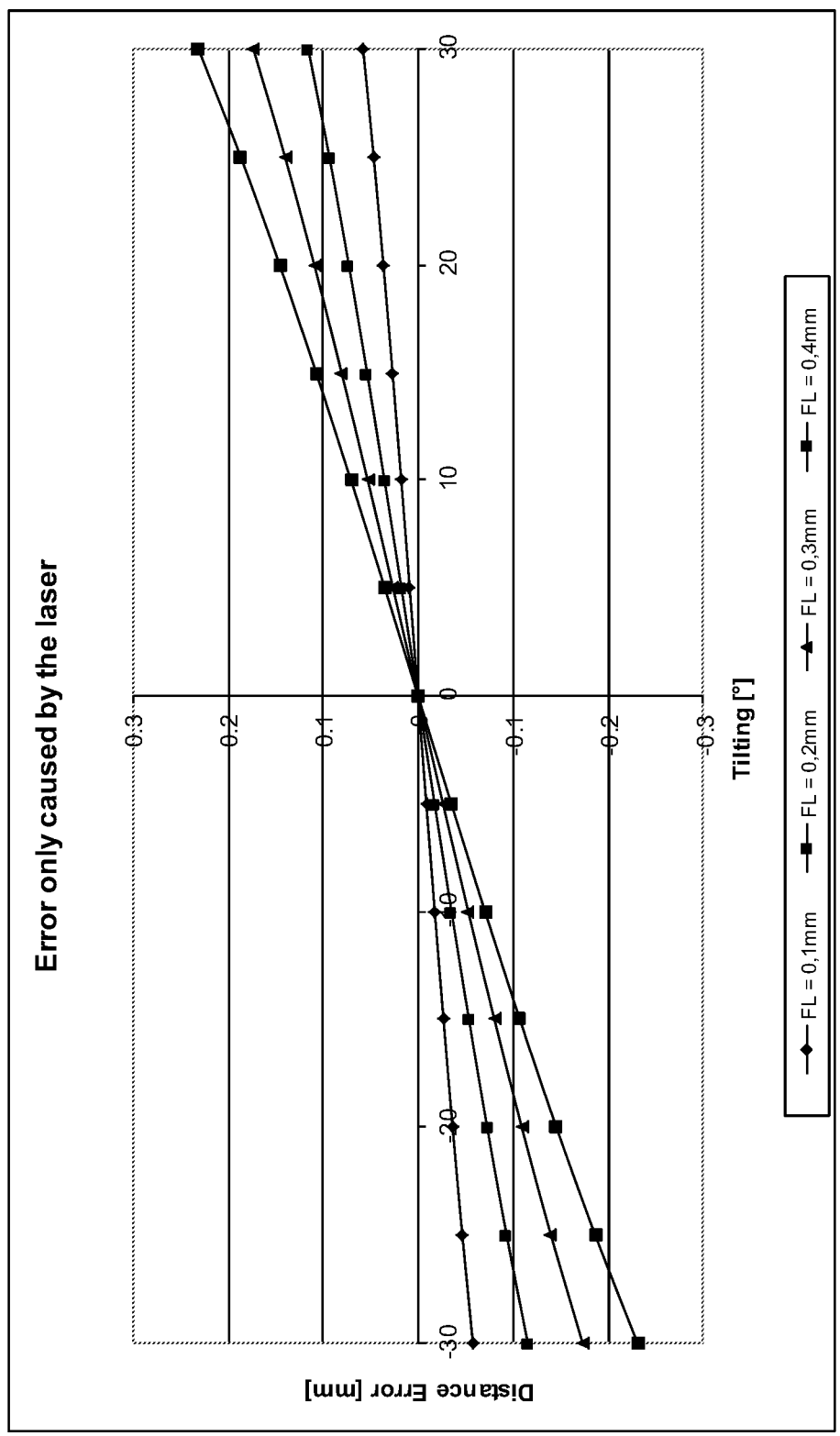

FIG. 3 shows the geometric relationships during the tilting test. First, via the tilting test at the position $x_0$ and from the known tilting of the master part of a known thickness $D_{Master}$, the displacement/tilting $FL_{kali}(x_0)$ must be determined by means of the following calculation:

$$D_{Master} = D'' * \cos(\square) \tag{1}$$

D' is still not the actual measured value D''=Gap−(S1+S2) of the thickness measurement, but rather the value that has already been corrected by the displacement of the sensors (see FIG. 3):

$$D' = \text{Gap} - (S1' + S2). \tag{2}$$

S1' is the measured value that has already been corrected by the displacement FL, for which applies:

$$S1' = S1 - FL * \tan(\square). \tag{3}$$

With the actual measured values for sensor 1 (S1) and sensor 2 (S2) and the known thickness of the master target $D_{Master}$, the displacement $FL_{kali}(x_0)$ at the calibration position $x_0$ can now be determined.

The (across the traversing width variable) displacement is generally composed of $$FL(x) = FL_0 + dFL(x),$$

whereby the function dFL(x) is known from the compensation run.

According to the above instructions, the actual absolute displacement at the calibration position $x_0$ is measured as follows:

$$FL(x_0) = FL_{kali}(x_0) = FL_0 + dFL(x_0)$$

From this $FL_0$ can be determined by $$FL_0 = FL_{kali}(x_0) - dFL(x_0)$$

Finally, displacement of the sensors that is variable across the traversing width is $$FL(x) = FL_0 + dFL(x) = FL_{kali}(x_0) - dFL(x_0) + dFL(x)$$

If the calibration is performed at the starting position, i.e. $x_0=0$, the following is directly applicable:

$$FL_0 = FL_{kali}(x=0).$$

With reference to FIGS. 6 to 11, the tilting test provides the following results:

FIGS. 6 to 11 show the raw signal of the determined thickness at a tilting of the master part (thickness=5.004 mm) of +/−10°. At a 10° tilt, the calculated thickness, caused by the tilting of the measurement object, is 5.081 mm. The determination of the laser adjustment error FL was conducted at a traversing position of 498 mm. In each case the thickness is plotted on the left and the sensor changes are plotted on the right y-axis.

Figure 6:
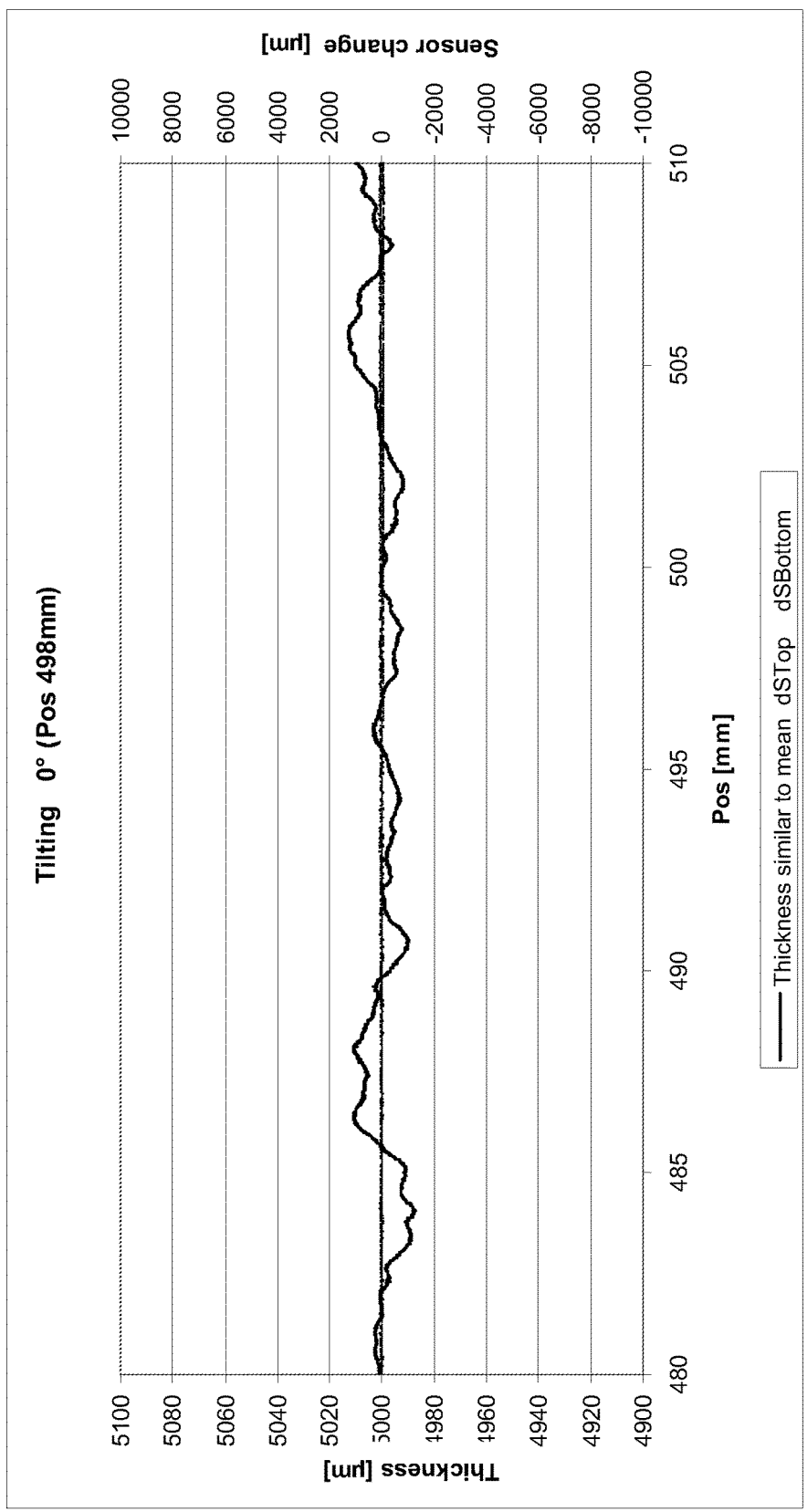
Figure 7:
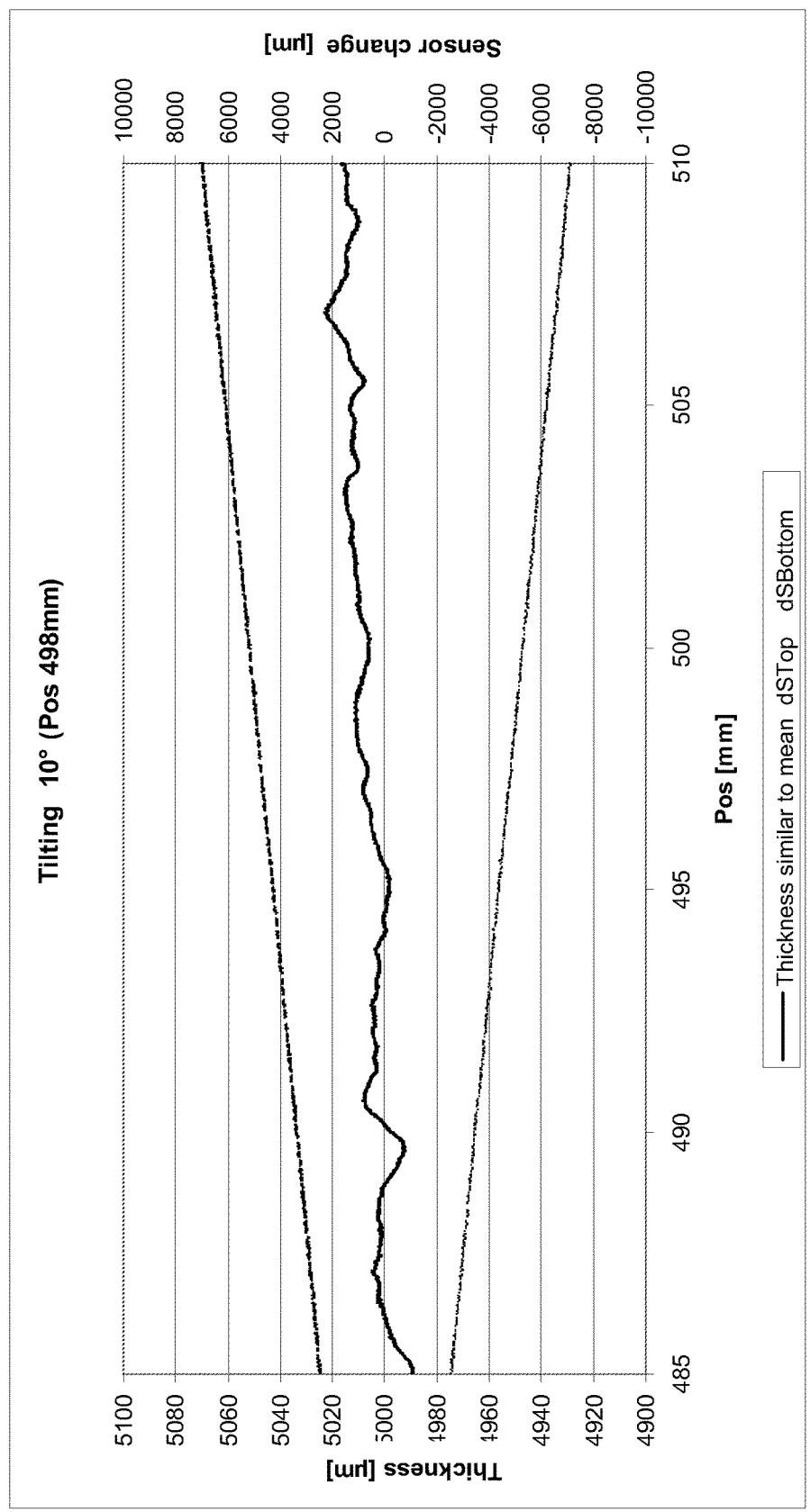
Figure 8:
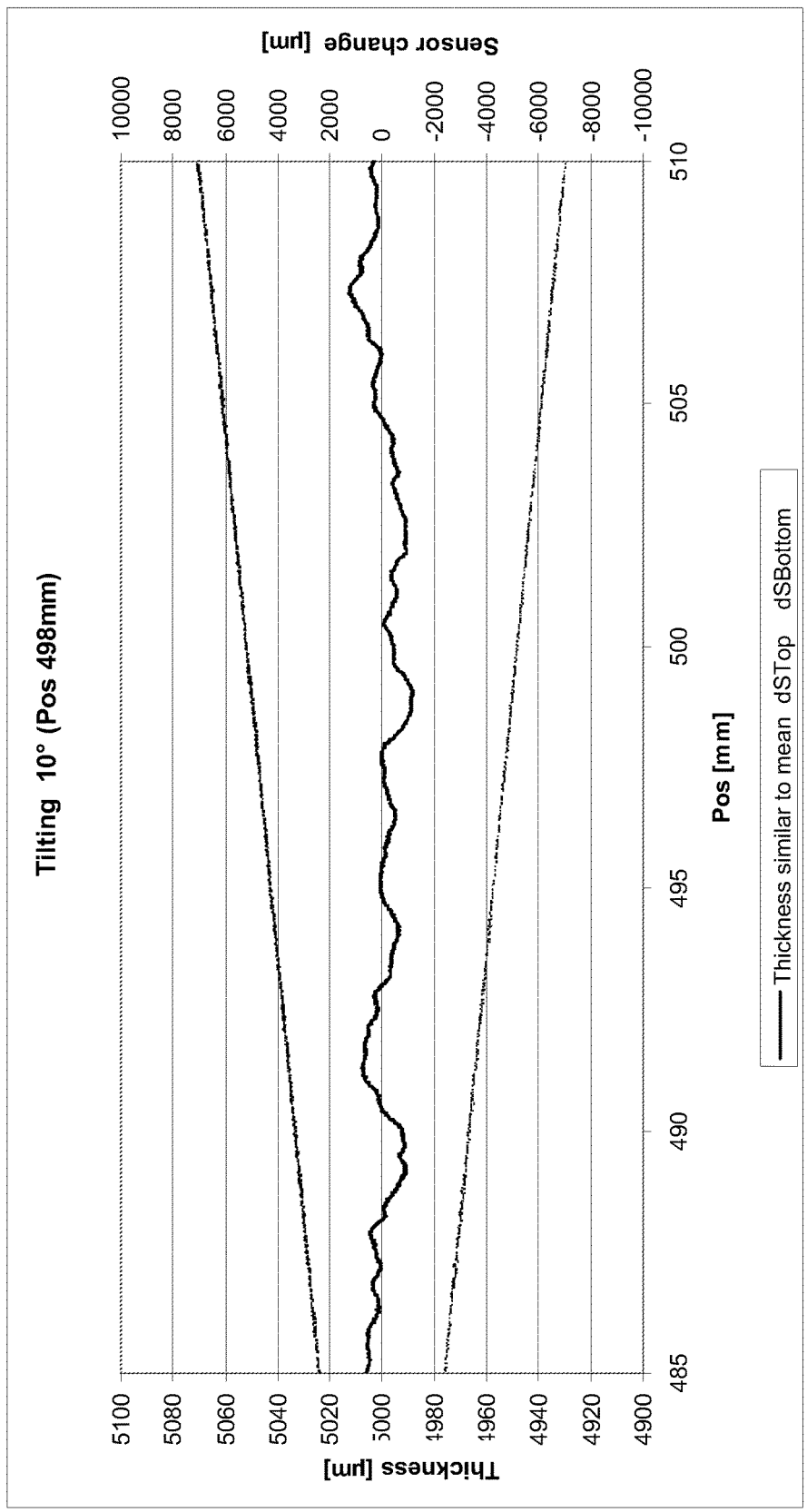
Figure 9:
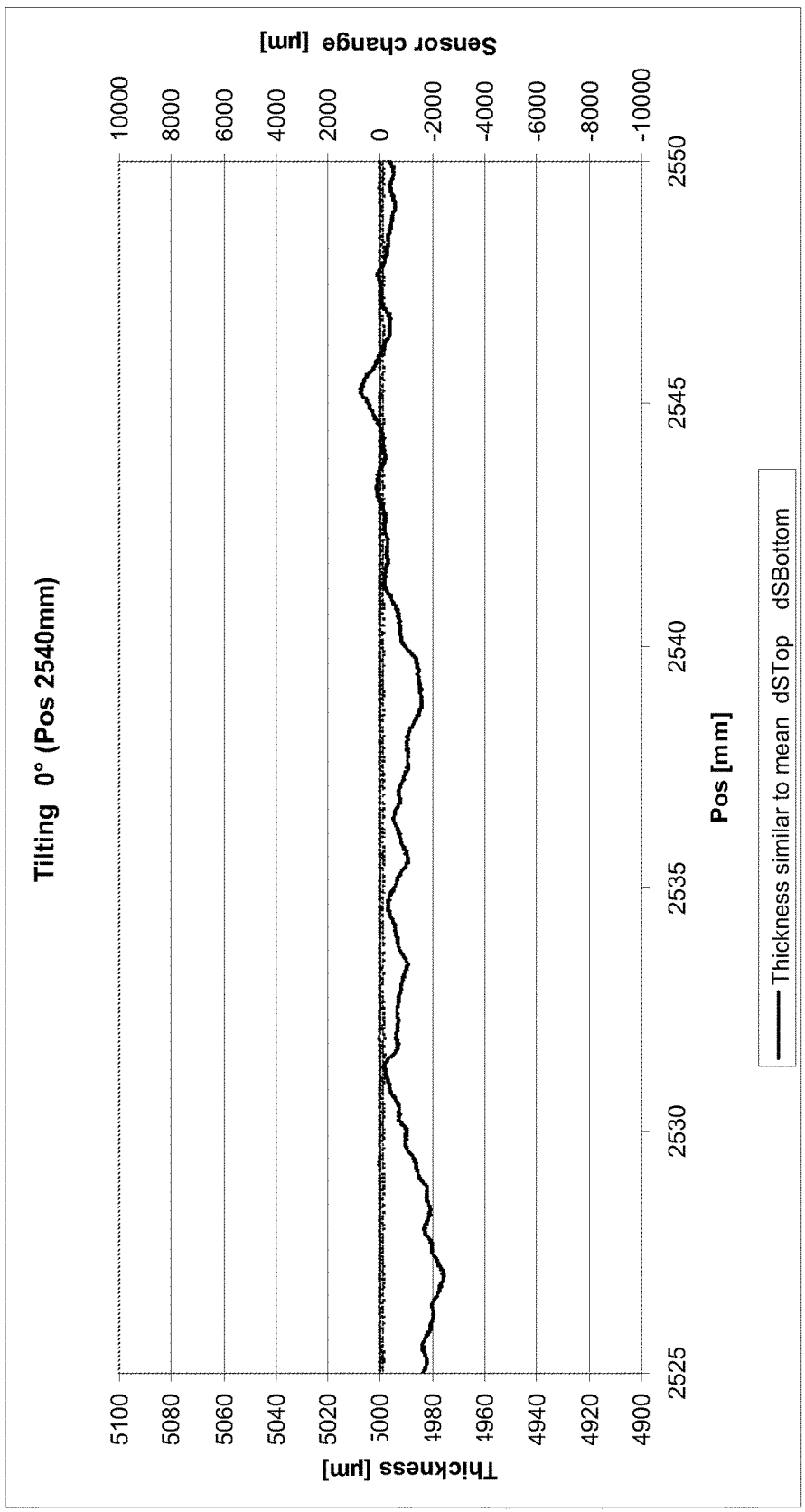
Figure 10:
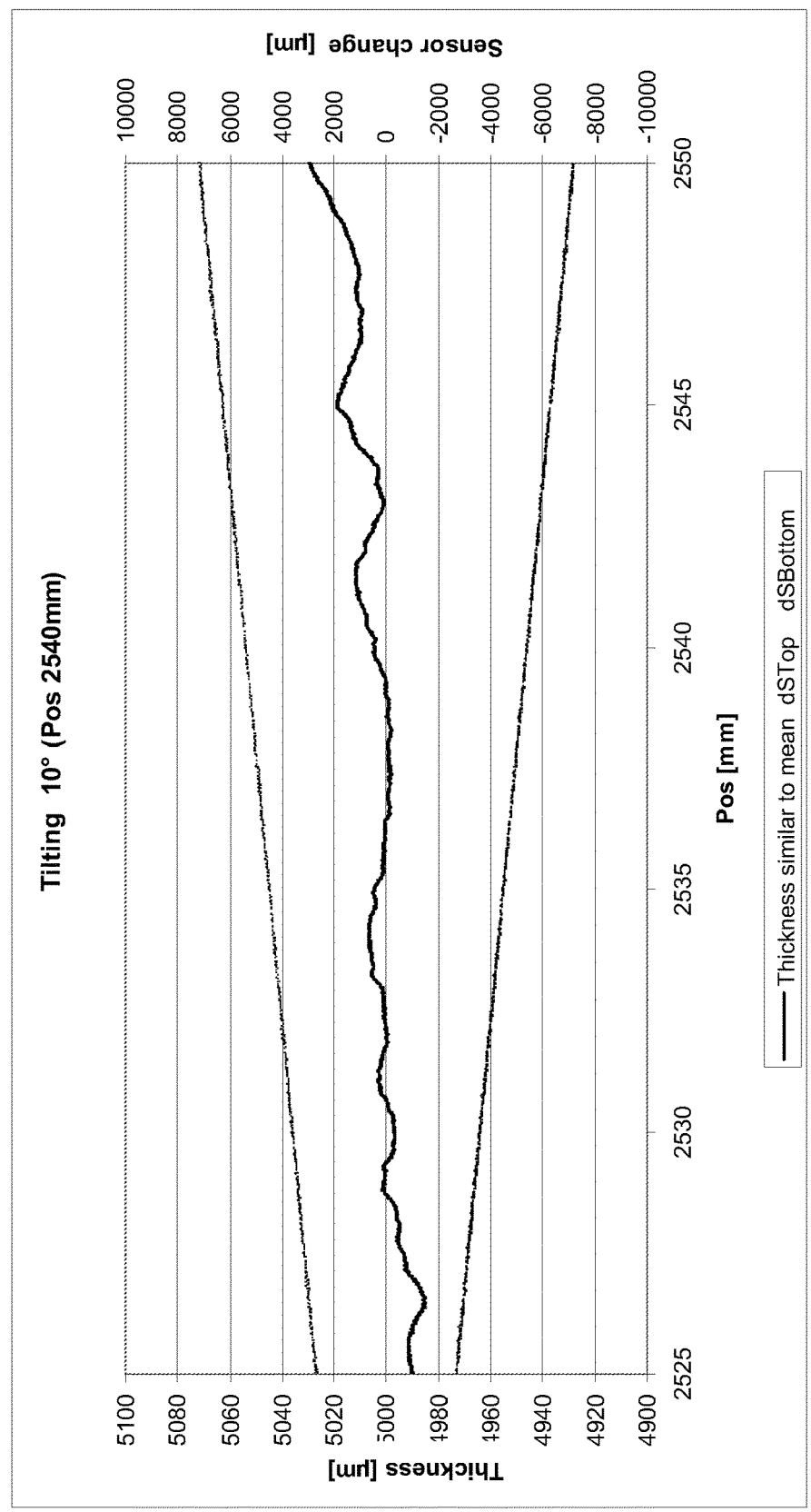
Figure 11:
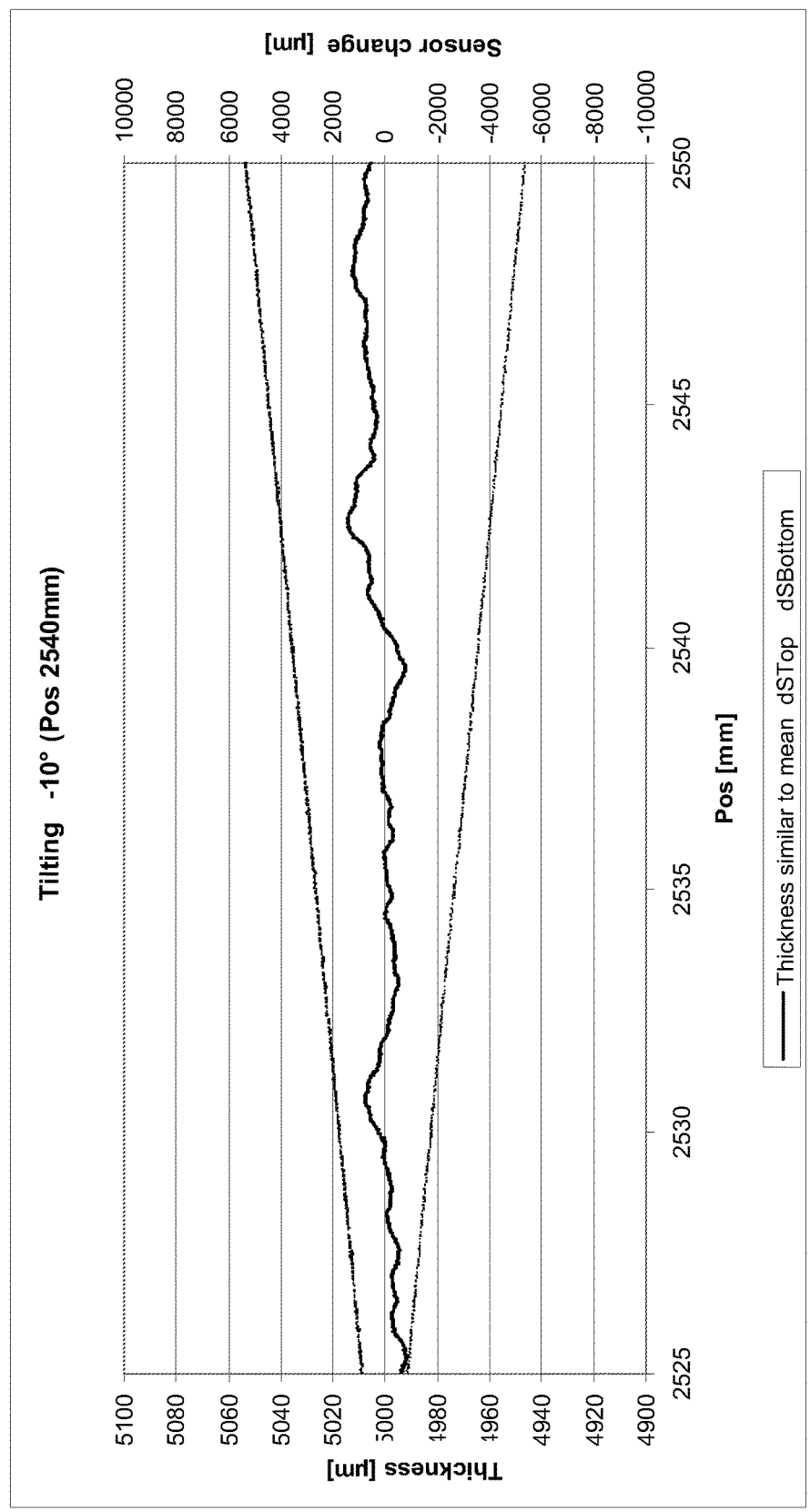

In detail, FIGS. 6 to 11 show:
FIG. 6: Tilting of the measurement object by 0°, traversing position (x-direction) at 498 mm
FIG. 7: Tilting of the measurement object by 10°, traversing position (x-direction) at 498 mm
FIG. 8: Tilting of the measurement object by −10°, traversing position (x-direction) at 498 mm
FIG. 9: Tilting of the measurement object by 0°, traversing position (x-direction) at 2540 mm
FIG. 10: Tilting of the measurement object by 10°, traversing position (x-direction) at 2540 mm
FIG. 11: Tilting of the measurement object by −10°, traversing position (x-direction) at 2540 mm Thus, in a completely analogous manner, the actual thickness of a measurement object of unknown thickness can be determined, in which not only the tilting error, but also the error resulting from the displacement/tilting of the sensors is compensated.

First, the actual measured values S1 and S2 are recorded. The value S1', that is corrected by the displacement/tilting of the sensors, has to be calculated from S1:

$$S1'=S1-FL*\tan(\square)$$

The thickness D' is obtained from the value S1', that is corrected by the displacement $$D'=Gap-(S'+S2).$$

For the actual thickness of the measured object applies then, analogously to (1), $$D=D'*\cos$$

A tilt in y-direction, i.e. in production direction, results in the following:

In order to be able to compensate for a tilting of the measurement object in the production direction (y-direction), the same conditions apply as are described above. The tilting of the measurement object in y-direction must likewise be determined by measurement. It is also conceivable to have an additional line sensor or a point sensor pair, which determines the tilt in y-direction. It should be made clear that the laser lines of the sensors used for the thickness measurement are still aligned in x-direction. However, if the measurement object is tilted in y-direction, the displacement/tilting of the sensors in y-direction has a completely analogous effect on the thickness measurement.

Figure 12:
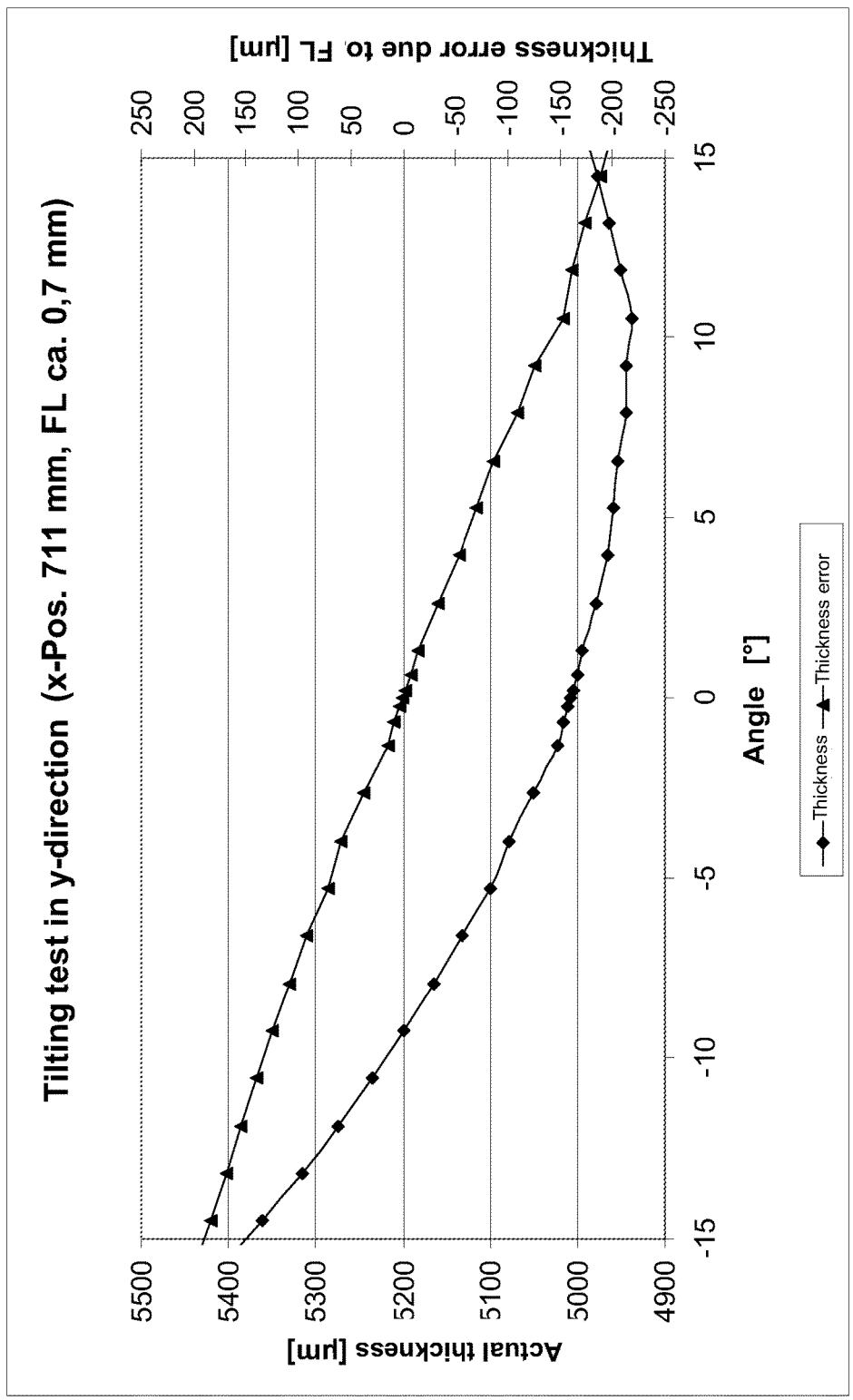

FIG. 12 shows the measurement error if the axes of the sensors are not on top of one another (laser adjustment error FL ca. 0.7 mm, target thickness 5.004 mm). The measured thickness is plotted on the left y-axis, the thickness error, caused only by the incorrect laser adjustment, is on the right. Here, too, the sensors are tilted as a function of the x-position, but in y-direction. The laser adjustment error FL of the two sensors at one position $x_0$ is therefore calculated in a completely analogous manner. The variation of this error is recorded during the compensation run.

As described for the tilting of the measurement object in x-direction, the actual error of the laser adjustment is calculated here as well, namely as follows:
1. Master measurement of the gauge block at a 0° tilt. Thus the constant "Gap" of the thickness calculation formula is known.
2. Calculation of the offset (=caused by incorrect laser adjustment FL) at a tilt of 10° . . . 20° in y-direction.
3. Calculation of the offset at a tilt of –10° . . . –20° in y-direction.

Figure 13:
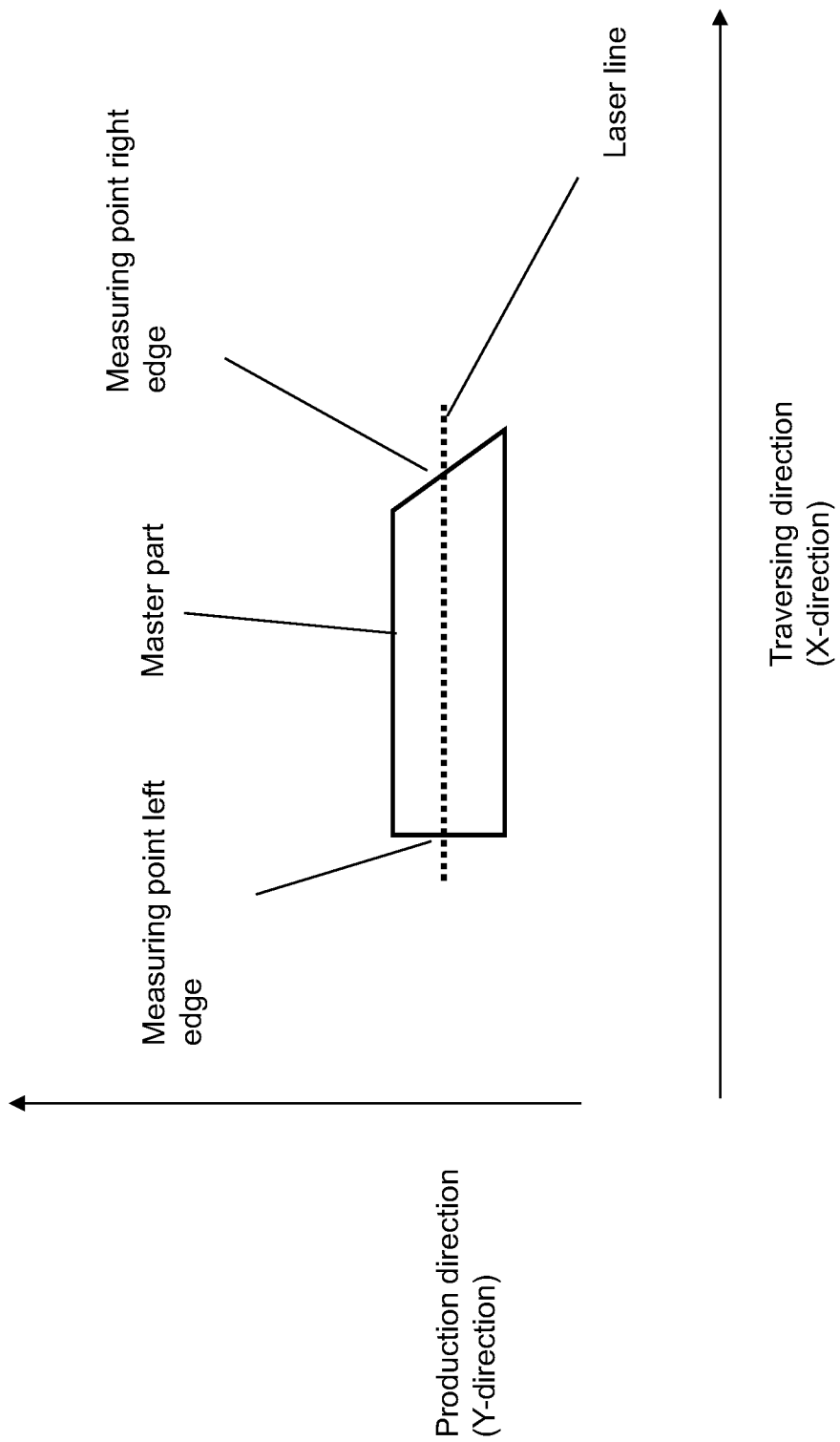

The variation of the laser adjustment error for the y-direction is recorded during the compensation run (=pivoted-in Master Target, moving the traversing unit in x-direction). This can be carried out in a particularly simple manner with the same master part, whereby the master part exhibits a slanted edge on the side opposite to that for the compensation of the x-displacement. This refers to an edge, the orientation of which deviates from the perpendicular to the traversing direction (=transport direction), preferably by 45°. FIG. 13 illustrates this relationship. If the alignment of the sensors in y-direction changes, the laser line sweeps across the orientation of the edge, which deviates from the perpendicular to the traverse direction (x-direction), in the example the 45°-direction, whereby the measured value, namely the length of the laser line on the measurement target, changes. Therefore, a conclusion on the tilting in y-direction can be drawn from the measurement point, which is on the edge, or the length of the laser line.

Figure 14:
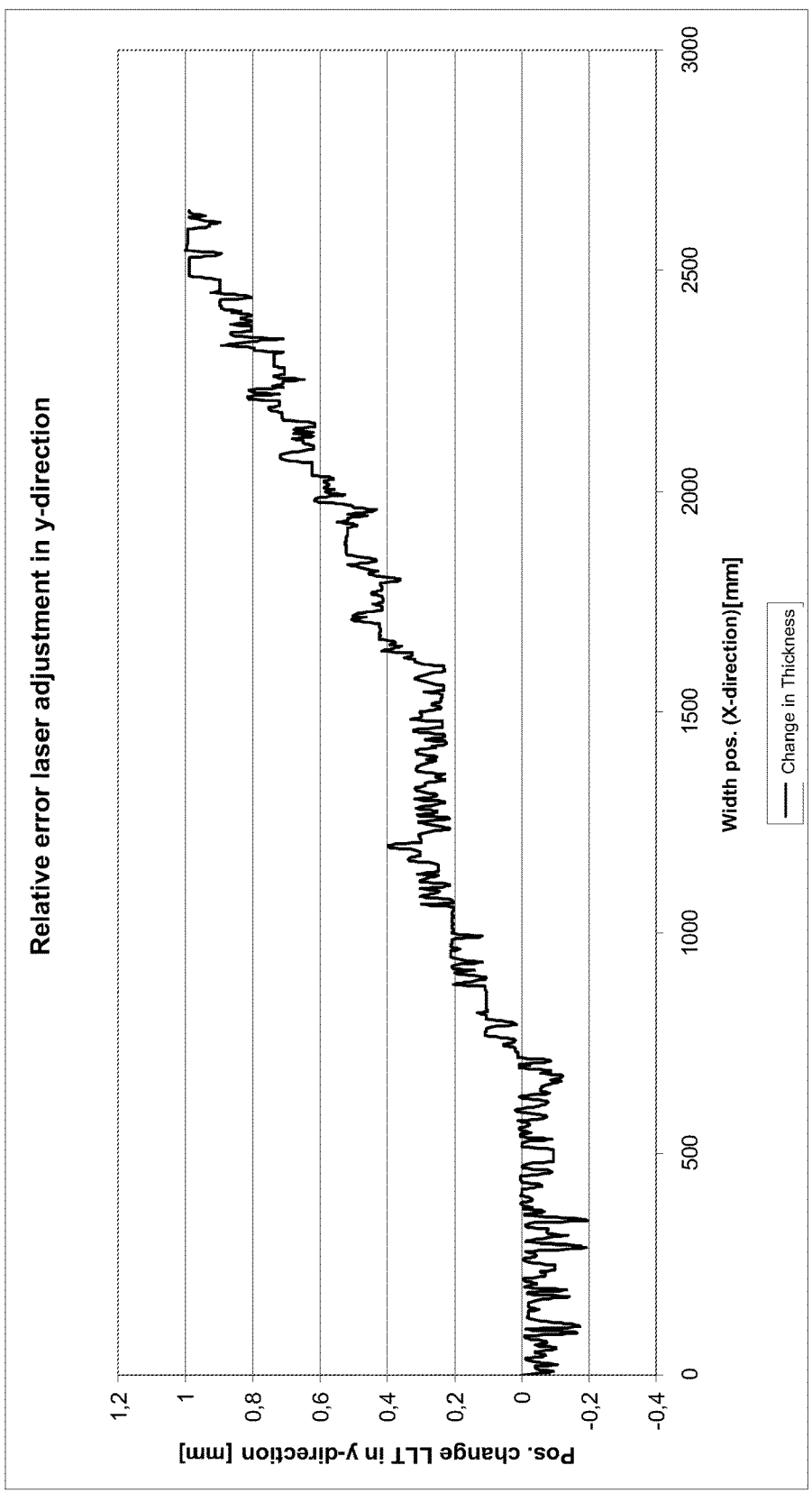
Figure 15:
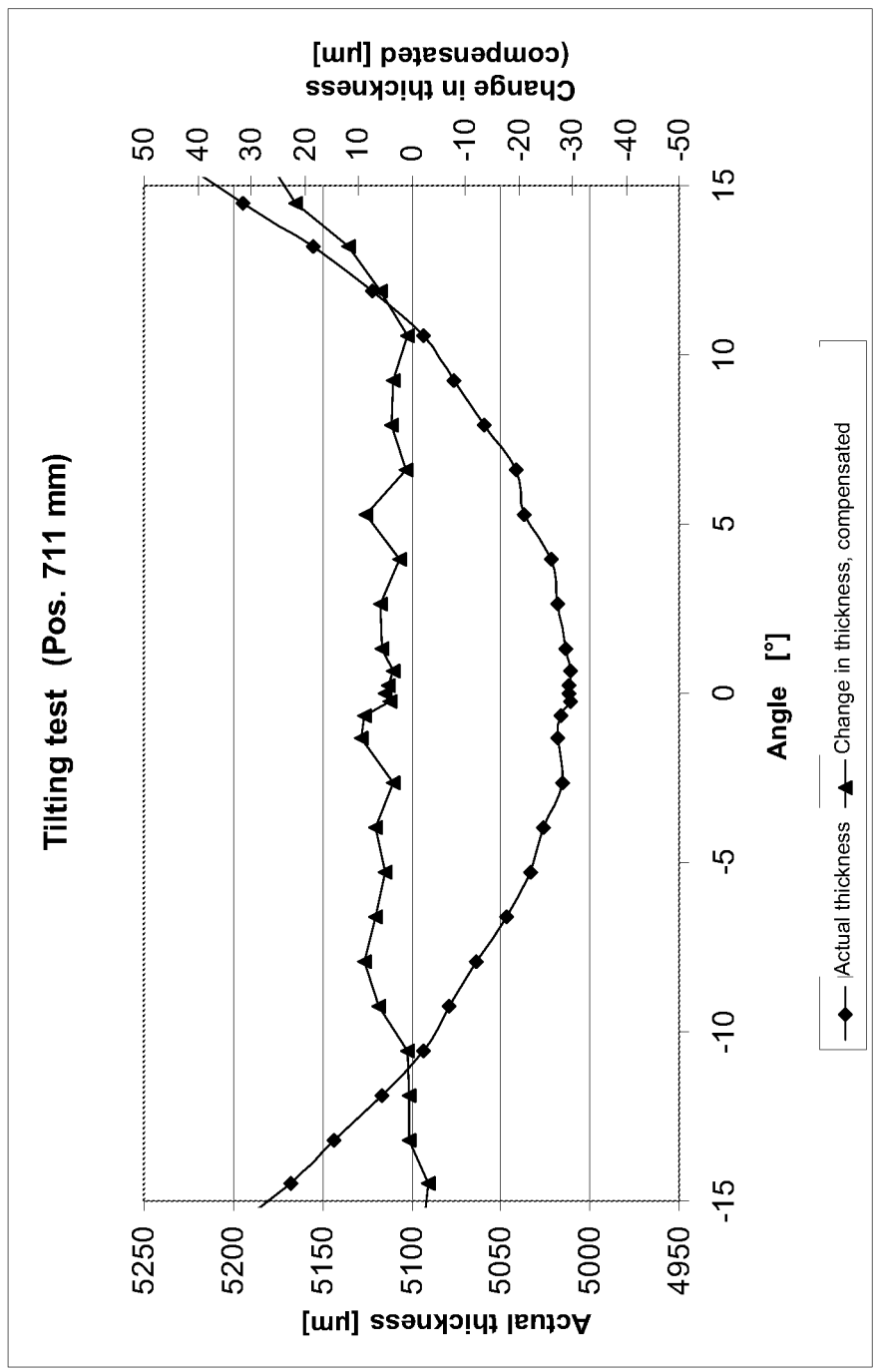
Figure 16:
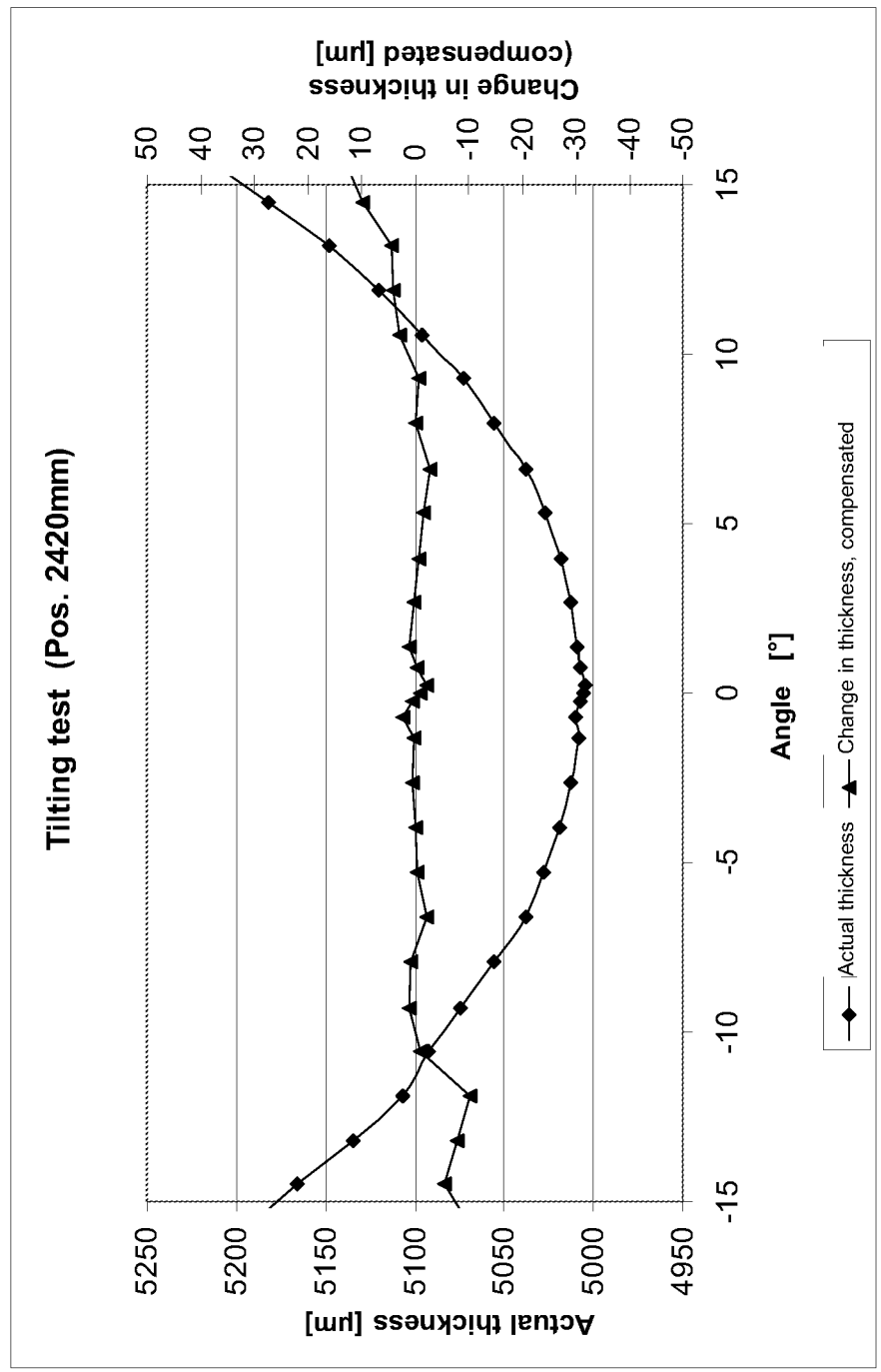

FIG. 14 shows the variation of the laser line on the master target in y-direction:

FIGS. 15 and 16 show the result after a successful compensation of the tilting error.

The values in FIG. 15 are recorded at the position at which the laser adjustment error was determined. FIG. 16 is recorded while taking into consideration the offset variation, which was determined during the compensation run.

In each case, the determined, real thickness is plotted on the left y-axis, without taking into account the angle error. The right y-axis shows the thickness variation corrected by the angle error, taking into consideration the laser adjustment error FL.

Finally, it is hereby expressly stated that the design examples of the method according to the invention described above serve only to explain the claimed teaching, but do not limit the teaching to these design examples.

The invention claimed is:

1. Method for measuring the thickness on measurement objects, the method comprising the steps of:
   measuring, via at least one sensor, against the object from the top;
   measuring, via at least one other sensor, against the object from the bottom;
   calculating, at a known distance of the sensors to one another, the thickness of the object according to the formula D=Gap−(S1+S2), whereby D=the thickness of the measurement object, Gap=the distance between the sensors, S1=the distance of the top sensor to the upper side of the measurement object, and S2=the distance of the bottom sensor to the underside of the measurement object;
   pivoting, via a pivot mechanism, a calibration means into and out of a measurement range between the sensors, the calibration means exhibiting an edge in a traversing direction;
   determining a displacement or a tilting of the sensors using the calibration means; and
   correcting the calculated thickness based upon a compensation for a measurement error caused by the displacement or tilting of the sensors determined using the calibration means.

2. Method according to claim 1, wherein the effect of the displacement and/or the tilting of the sensors on the thickness measurement is determined by means of a calibration run of the sensors in at least one of a longitudinal direction or a transverse direction to the measurement object.

3. Method according to claim 1, wherein the effect of the displacement and/or the tilting of the sensors on the thickness measurement is determined by means of a calibration run of the sensors in at least one of the direction of movement or a direction transverse to the direction of movement.

4. Method according to claim 2, wherein the calculated thickness or the calculated thickness profile of the measurement object is corrected on the basis of the data from the calibration run.

5. Method according to claim 1, wherein line sensors, in particular laser-line sensors, are used as sensors, so that tilting can be determined in one axis or in two axes.

6. Method according to claim 1, wherein at least two or three point sensors per side are used as sensors, so that tilting can be determined in one axis or in two axes.

7. Method according to claim 1, wherein line sensors are used on one side and a plurality of point sensors are used on the other side.

8. Method according to claim 1, wherein the sensors are moved in a C-frame with a fixed mounting/allocation of the sensors or in an O-frame with a connection to movable linear axes.

9. Method according to claim 1, wherein in the event of tilting in a direction transverse to the movement direction, a compensation of the measurement error occurs via the following steps:

performance of a master measurement on a gauge block at 0° tilt; and calculation of the offset caused by incorrect sensor adjustment by tilting at predetermined angles, preferably 10° to 20° and −10° to −20° in the direction transverse to movement, in direction of the traversing of the sensors, whereby an x-offset in direction transverse to movement is calculated with a known angle of tilt and gap value.

10. Method according to claim 9, wherein, with at least slightly different velocities of the linear axes in traversing direction, a determination of the x-offset as a function of the position in traversing direction is determined by pivoting a gauge block with a known thickness into the measuring gap during the compensation run and moving it across the entire width of the measuring gap.

11. Method according to claim 10, wherein the gauge block is fixed to the bottom sensor, preferably to a carriage, so that the x-offset of the bottom sensor to the gauge block is zero, that the gauge block is aligned in such a way that the top sensor detects an edge of the gauge block, and that during the compensation run the edge of the gauge block is recorded as a function of the position in traversing direction, so that, based on the determination of the edge of the gauge block, absolute measured values in x-direction are available, by means of which the displacement of the top sensor to the bottom sensor can be calculated.

12. Method according to one of claim 1, wherein in the event of tilting in a transport direction, a compensation of the measurement error occurs via the following steps:

performance of a master measurement on a gauge block at 0° tilt, and calculation of the offset caused by incorrect sensor adjustment by tilting at predetermined angles, preferably 10° to 20° and −10° to −20° in the movement direction, whereby an offset in y-direction is calculated at a known angle of tilt and gap value.

13. Method according to claim 12, wherein the change in the sensor adjustment error in y-direction is recorded during the compensation run, whereby the gauge block further exhibits an edge the orientation of which deviates from the perpendicular to the traverse direction, preferably by 45°, so that a change of the measured value on the edge defines a tilting of the sensor in transport direction.

14. Device for measuring the thickness on measurement objects, the device comprising:

at least one sensor positioned to measure against the object from the top;

at least one other sensor positioned to measure against the object from the bottom;

a calibration means that exhibits an edge in a traversing direction; and a pivot mechanism configured to pivot the calibration means into and out of a measurement range between the sensors, wherein:

at a known distance of the sensors to one another, the thickness of the object is calculated according to the formula D=Gap−(S1+S2), whereby D=the thickness of the measurement object, Gap=the distance between the sensors, S1=the distance of the top sensor to the upper side of the measurement object, and S2=the distance of the bottom sensor to the underside of the measurement object, a displacement or a tilting of the sensors is determined using the calibration means, and the calculated thickness is corrected based upon a compensation for a measurement error caused by the displacement or tilting of the sensors determined using the calibration means.

15. Device according to claim 14, wherein the calibration means additionally exhibits an edge the orientation of which deviates from the perpendicular to the traverse direction, in particular by 45°, and whereby the position of the edge is evaluated.

* * * * *